No. 782,017. PATENTED FEB. 7, 1905.
A. N. FAIRMAN.
PIPE MAKING MACHINE.
APPLICATION FILED AUG. 26, 1902.
10 SHEETS—SHEET 5.

Witnesses
Alex Currie
Frank H. Denman

Alfred N. Fairman
Inventor
By Attorney

No. 782,017. PATENTED FEB. 7, 1905.
A. N. FAIRMAN.
PIPE MAKING MACHINE.
APPLICATION FILED AUG. 26, 1902.

No. 782,017. PATENTED FEB. 7, 1905.
A. N. FAIRMAN.
PIPE MAKING MACHINE.
APPLICATION FILED AUG. 26, 1902.

No. 782,017. PATENTED FEB. 7, 1905.
A. N. FAIRMAN.
PIPE MAKING MACHINE.
APPLICATION FILED AUG. 26, 1902.

No. 782,017. PATENTED FEB. 7, 1905.
A. N. FAIRMAN.
PIPE MAKING MACHINE.
APPLICATION FILED AUG. 26, 1902.

No. 782,017. Patented February 7, 1905.

UNITED STATES PATENT OFFICE.

ALFRED NELSON FAIRMAN, OF MONTREAL, CANADA, ASSIGNOR TO MINA RUTH DUNHAM FAIRMAN, OF MONTREAL, CANADA.

PIPE-MAKING MACHINE.

SPECIFICATION forming part of Letters Patent No. 782,017, dated February 7, 1905.

Application filed August 26, 1902. Serial No. 121,143.

*To all whom it may concern:*

Be it known that I, ALFRED NELSON FAIRMAN, of the city of Montreal, district of Montreal, Province of Quebec, Canada, have invented certain new and useful Improvements in Pipe-Making Machines; and I do hereby declare that the following is a full, clear, and exact description of the same.

My invention relates particularly to machines for making conductor-pipes; and it has for its object to trim the longitudinal side edges of a blank and form said side edges with interlocking devices, to bend the blank into pipe form with said folded edges in engagement, and, finally, to lock said engaging edges and to corrugate the pipe longitudinally without the corrugated pipe being acted upon more than once during any stage of its manufacture.

The type of machine to which my invention has particular reference is one whereby a blank is first formed into a pipe and then corrugated; and the invention may be said briefly to consist of a machine of this type constructed to comprise three divisions, preferably arranged in tandem. The first division includes a clamping device for rigidly holding the sheet from which the blank is cut, a cutting or shearing and folding device for cutting the sheet to the required size and simultaneously folding the edges of the cut blank. The second division includes forming means whereby the blank is converted into a pipe with the folded edges thereof in engagement. The third division includes means for corrugating the pipe and simultaneously flattening the seam, while a feed device advances the blank from the first to the second division and the pipe from the second to the third division and finally delivers the complete corrugated pipe from the machine.

For full comprehension, however, of my invention reference must be had to the accompanying drawings, forming a part of this specification, in which like symbols indicate the same parts, and wherein—

The frame of my improved machine consists of four standards $b$, $c$, $d$, and $e$, bolted or otherwise secured to the floor and braced together by a pair of rods or bolts $f$, secured about midway of the height of the machine between the standards $b$ and $c$ and over which a pair of distance-pipes $g$ are fitted and localize said standards $b$ and $c$ relatively to one another. A pair of bracing angle-irons $h$ unite the upper portions of these standards, and an I-beam $i$, provided with flanges $j$ at each end, is bolted through said flanges to the standards $b$ and $c$ and is also supported upon brackets $k$, cast in one with said standards. This I-beam constitutes a bed-plate upon which the blank is held while it it sheared off and folded, and it has a pair of angle-irons $l$ bolted to the opposite sides thereof to serve as rails for the shearing and folding carriage, while a bar $m$, secured to said I-beam and extending longitudinally thereto, serves to guide said carriage in its movement. A clamping device clamps the sheet from which the blank is cut upon the bed-plate and consists of a pair of angle-irons $n$, having a series of distance-pieces $o$ between them, and they are secured together by bolts $p$, passing through said distance-pieces and said angle-irons. A series of bolts $q$ serve as fulcrum-pins for the lower ends of a series of adjustable toggle-links $r$, the upper ends whereof are pivotally connected by pins $s$, which also take through the lower ends of a second series of toggle-links $t$ and are carried between a pair of flat bars $u$, secured a short distance apart by a series of bolts $v$ and distance-blocks $w$, while the upper ends of the toggle-links $t$ are fulcrumed, as at $x$, between the bracing angle-irons $h$. This clamping device is actuated by means of an eccentric 2, mounted rigidly upon a shaft 3, journaled in a pair of bearings rigidly supported upon the standard $c$ on the side thereof opposite to that facing standard $b$, each standard being formed with a series of lightening-openings $y$, one of which in standard $c$ accommodates the eccentric. The strap 4 of this eccentric is integral with a rod 5, formed with an eye 6, pivoted upon the end pin $s$, and the shaft has a hand-lever 7 rigidly thereon.

The carriage, upon which is carried the means whereby the blank is cut from a sheet of metal and its edges are folded, is constructed and supported and caused to travel to and fro between the standards $b$ and $c$ as follows: A plate is bent into U form to constitute a hanger 10 with wings 11, the latter being braced by knee-braces 12, and a shoe 13, having a transverse dovetail recess, is set and fits snugly in the hanger and has a pair of gibs 14 therein, which receive between them the guiding-bar $m$, rigidly upon the under side of the I-beam and extending longitudinally thereto, while a series of set-screws 16 project through each side of the hanger and are threaded through tapped borings in each side of the shoe and bear upon the gibs to allow of adjustment of the hanger laterally relatively to the I-beam. A second series of adjusting-screws 17 are threaded up through the bottom of the hanger and bear in sockets in the under side of the shoe, these screws being of sufficient strength to prevent the accidental displacement of the shoe from the hanger, and the function thereof is to adjust the hanger vertically relatively to the I-beam. Four trundle-rollers 18, mounted upon trunnions 19, rigidly carried by the hanger, run upon the rails constituted by angle-irons $l$, and it is upon these rollers that the total weight of the carriage and the parts carried thereby are supported. A pair of shearing and folding devices are supported upon the wings 11 adjacent to the hanger and consist of a pair of adjustable supporting-frames comprising a flat plate 20 and an angular block 21, rigidly secured together by a screw 22 and tongue-and-groove connection 23 between the lower edge of said angular block and the plate. This tongue-and-groove connection retains these parts against displacement relatively to one another, while the frames are adjustably secured to the wings 11 by bolts 323, projecting therethrough and through slots 24 in the wings and extending transversely of the machine. Each of the angular blocks has a rigid arm 25 upon the outer end, whereof a forked bracket 26 is adjustably secured by a tongue-and-groove connection 27 and a bolt 28, taking through a slot 29 in the end of the arm and a boring in the forked bracket, while a spindle 30, carrying a shearing-disk 31 between its ends, is mounted in the prongs of this forked bracket, thus providing bearings at both sides of the disk. Angular arms 32 are formed upon the base-plates 20, and each has secured thereto a bearing-bracket consisting of a bored block 33, having a laterally-projecting open frame 34 integral therewith, a spindle 35 bearing in said boring and in a boring in the outer side of the frame. This spindle has a shearing-disk 36 rigidly on one end thereof, and its opposite end thereof is diminished and the portion contiguous to said diminished portion threaded to receive a nut 37, which acts as an abutment for a spring 38, the function whereof is to yieldingly maintain the latter disk in shearing engagement with the disk 31. The frames (constituted by the base-plate and angular blocks) receive the folders, which consist each of a pair of members of special facial formation. These members are secured (by screws 332) one upon the other and to and within the frame at the front or operator's side of the machine and are formed to upwardly curve and downwardly and outwardly fold the one edge of the blank, while the members in the rear frame upwardly curve and horizontally inwardly fold the opposite edge of the blank. Of the first-mentioned pair of members the under one consists of a plate formed with a concavo-plane vertical rib 333, extending from end to end thereof and increasing gradually in height from the forward end thereof, or that which first engages the blank, (as will be presently shown,) to the rear end thereof, and this forward end is formed with a gentle curve 334, while a clearance-groove 335 extends longitudinally of and adjacent to the plane side of the rib, which is inclined slightly from its top downward toward the convex side thereof. The upper member also consists of a plate formed with a groove 336, extending longitudinally thereof, and one complete wall 337 of this groove corresponds to the concavo side of the rib, and the other wall gradually turns toward the convex wall and in so doing assumes first a concave form 338 and then constitutes a plane portion 39, inclined slightly downwardly and toward the convex wall. These members coact to bend the front edge of the blank to a quadrantal curve, as at 40, with an outwardly-projecting lip 41. The members of the former at the rear of the machine consist of a pair of bars, one of which is formed with a convex face 42 and a recessed edge 43, and it is secured by screws 44 to the overhanging portion of its carrying-frame. The other member or bar has a continuous concave recess 45 in one side, which is flared at one end, as at 46, and a flange 47 overhangs this recess and is adapted to register with the recessed edge 43 of the other member of this former. These members coact to bend the rear of the blank to a quadrantal curve, as at 145, with an inwardly-projecting lip 146. This carriage (as well as the carriages in the second and third divisions of the machine) is caused to travel to and fro between the standards by a pair of reciprocating racks 50 51, to be hereinafter described in connection with the driving-gear.

Figure 16:
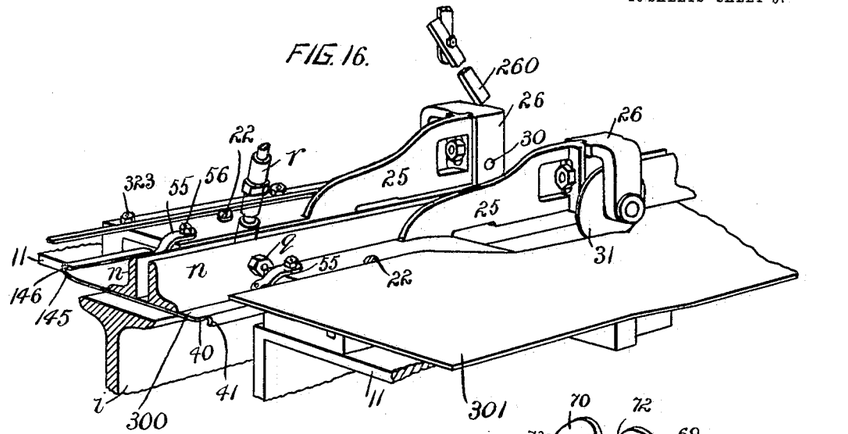
Fig. 16 is a detail perspective view of a portion of the carriage in division one, illustrating particularly the means for trimming the longitudinal side edges of the blank and forming interlocking devices thereon.
Figure 17:
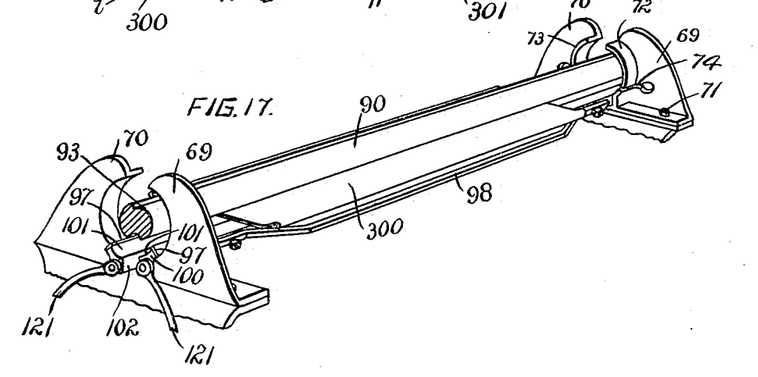
Figs. 17, 18, and 19 are detail views illustrating the means for forming the pipe from the blank.
Figure 18:
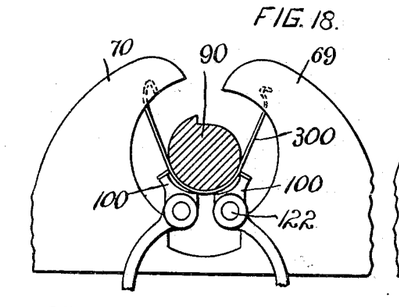
Figure 19:
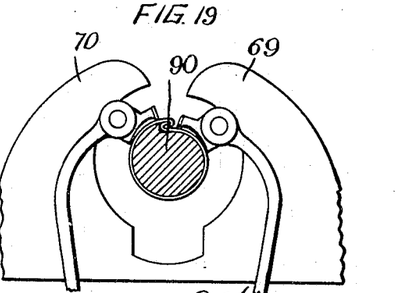
Figure 20:
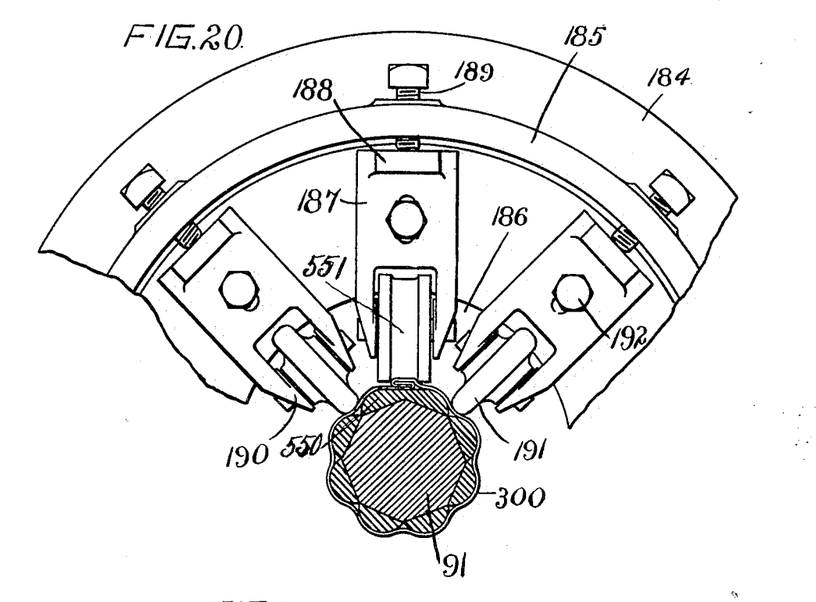
Fig. 20 is a detail front elevation of a segment of the corrugating-carriage.
Figure 21:
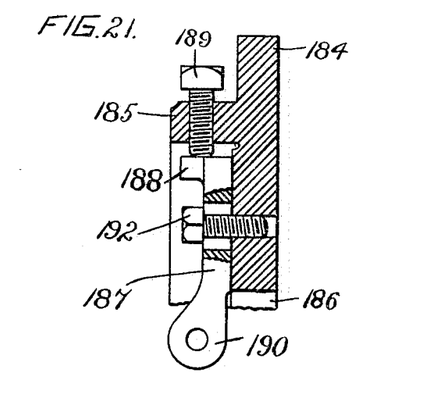
Fig. 21 is a detail side elevation of one of the brackets for supporting the corrugating-rollers.

After the sheet is cut to the required size and formed with its locking-lips the machine is reversed, as will be presently set forth, and the blank delivered to the second division by means of a pair of pusher-arms carried by the first carriage and each consisting of a bar 55, secured at one end by bolts 56 or otherwise to the top of the frames in which the lip-formers are carried. The other end thereof is formed with a transverse slot 57, enlarged at its inner end and in which a spring-clip 58 is sprung and rigidly held with its fingers projecting therefrom above and below it. These bars are each downwardly offset sufficiently to bring the lower edges of their free ends to a level slightly above the level of the sheet metal upon the bed-plate, while the resilient fingers of the clip are normally when not resting upon the blank sprung above and below the same.

Coming now to the portion of the machine between the standards c and d, I will now describe the means whereby the blank is curved into pipe form and the edges thereof interlocked.

Tubular braces 60 and 61 (similar to the braces g) extend between and are connected, respectively, to the upper ends and slightly above the middle of these standards, and a pair of channel-irons 62 are secured to these standards slightly below the middle thereof. A pair of pipe-forming cams 64 and 65 are located between and a short distance from each standard, and each of said cams consists of a base portion 66, bolted, as at 67, to the top of the channel-irons and having a flange 68 at its upper end to which a pair of cam-plates 69 and 70 are bolted, as at 71. These cam-plates are formed with curved inner forming faces 72 and 73, the face 72 being formed on a curve of slightly less radius than the face 73 and offset downwardly therefrom, while a pair of slits 74 with enlarged inner ends are cut into the cam-plates of the cam 64 from their inner faces to allow of the passage of the blank to its position between the cams 64 and 65. A mandrel and a pair of bending-bars coact with these cams to bend the blank into pipe form. The mandrel is made in two parts, and it extends from the standard c through standard d to standard e, one end thereof being connected by a bracket 80 and pin 81 to the standard c and its other end to the standard e by a connecting-plate 82, bolted thereto and having a flared mouth 83, which receives the end of the mandrel, while the latter is prevented from sagging by a supporting antifriction-roller 84, supported in a bracket 85 upon the standard d and upon which the mandrel rests through the medium of a small antifriction-roller 86, carried thereby in a slot 87. One, 90, of the parts of the mandrel is located in the second division of the machine and extends from the second to the third standard, and the other part, 91, is located in the third division and extends from the third to the fourth standard. The part 90 is solid and slightly volutoid in cross-section and has a groove 92 of semicircular cross-section in its under side, the volutoid form presenting a surface with the portion 93 of the top thereof to one side of the vertical axial plane set below the adjoining portion 94 to the other side of said vertical plane.

Figures 3, 4, 5, 6, 7, 8:
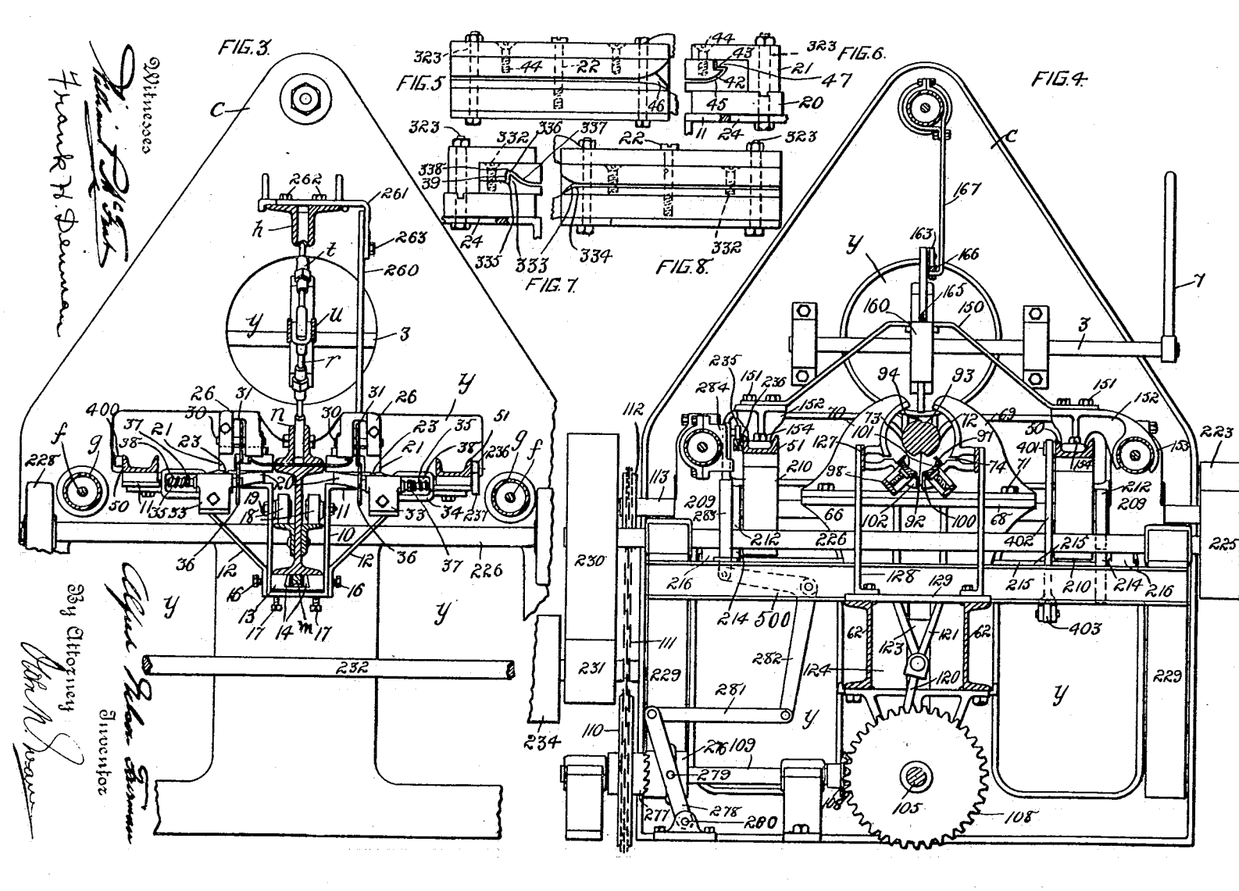
Fig. 3 is a transverse vertical sectional view taken on line A A, Fig. 1, and illustrating particularly the means for cutting the blank and simultaneously folding the edges thereof.
Fig. 4 is a similar view to Fig. 3, taken on line B B, Fig. 1, and illustrating particularly the forming-bars, their operating-gear, the pipe-feeding carriage, and the driving-gear generally.
Figs. 5, 6, 7, and 8 are detail views of the edge-formers for forming the interlocking lips upon the side edges of the blank.
Figure 9:
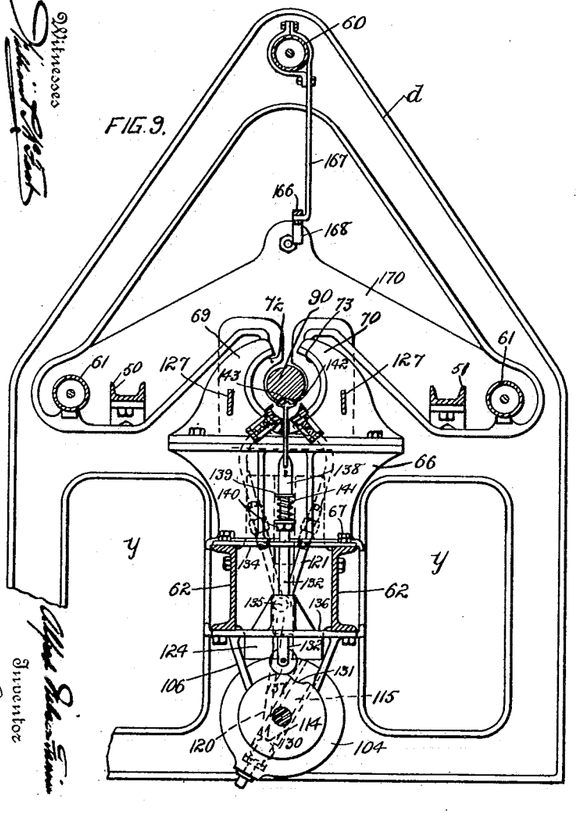
Fig. 9 is a similar view to Fig. 4, but looking in the opposite direction, taken on line C C, Fig. 2.
Figure 10:
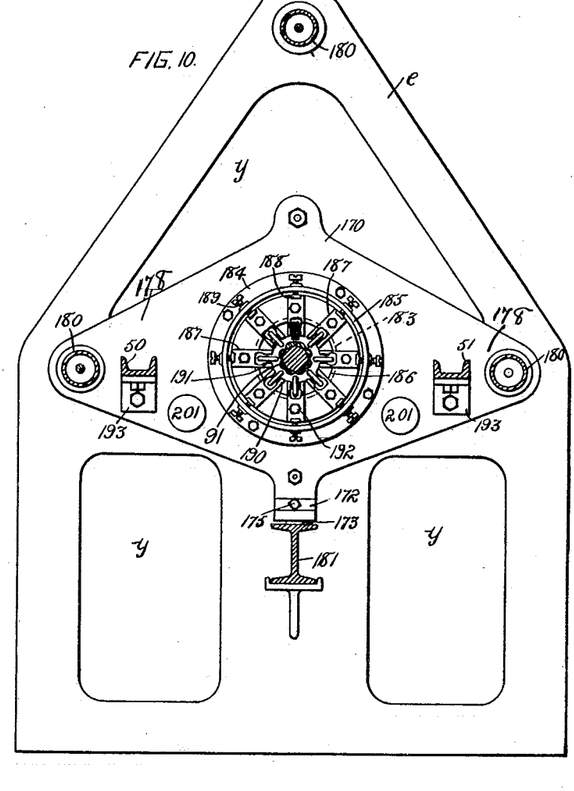
Fig. 10 is a similar view to Fig. 9, taken on line D D, Fig. 2, and illustrating particularly the corrugating means.
Figure 22:
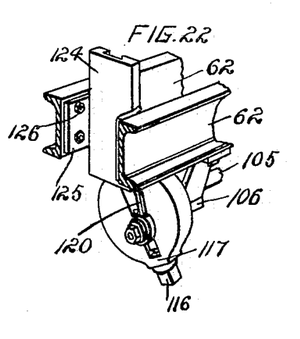
Fig. 22 is a detail perspective view of one of the guides used in connection with the pipe-forming bars, together with the eccentric for actuating one pair of said bars and the means for supporting said guide.
Figures 28, 29, 30, 31, 32, 33, 34, 35, 36:
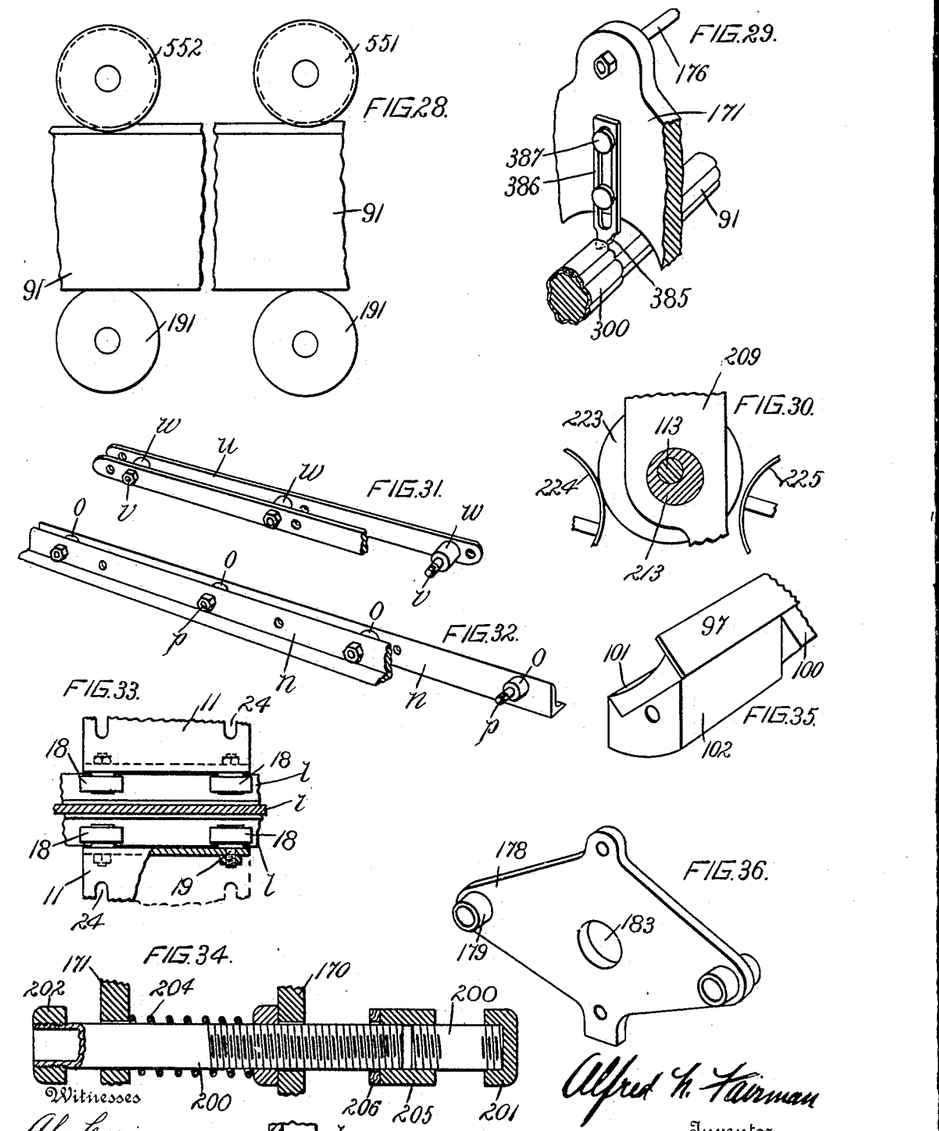
Fig. 28 is a longitudinal sectional view of a portion of the third division of the machine, illustrating particularly the relative positions of the corrugating-rollers upon one frame or head and the corrugating-rollers of the other frame or head of the corrugating-carriage.
Fig. 29 is a perspective view of a portion of the corrugating-carriage, illustrating particularly the foot carried thereby for engaging the corrugated pipe and enabling it to be delivered from the machine.
Fig. 30 is a longitudinal sectional view of the middle portion of the machine, illustrating particularly the eccentric whereby the driven drum is shifted into bearing relation with either of the driving-drums or out of bearing relation with both.
Fig. 31 is a perspective view of the link-bars of the clamping mechanism and illustrating particularly the distance-blocks between said link-bars.
Fig. 32 is a similar view of the clamping-bars and illustrating particularly the distance-blocks between them.
Fig. 33 is a horizontal sectional view taken through the carriage in the first division above the hanger which straddles the longitudinal I-beam and illustrating particularly the trundle-rollers for supporting said carriage.
Fig. 34 is a longitudinal sectional view of the buffer carried by the corrugating-carriage.
Fig. 35 is a perspective view of the bearing-block guided in the guiding-frames of the pipe-forming bars in the second division of the machine.
Fig. 36 is a perspective view of one of the frames or heads of the corrugating-carriage.
Figure 37:
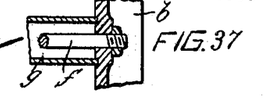
Fig. 37 is a sectional view of a portion of the frame of the machine, illustrating the connection of one of the stays.

The blank-bending or pipe-forming bars consist of bearing-bars 100, each having one face 101 concave and a convex bearing-block 102 at each end, while a pressing-in plate 97 is carried rigidly by the upper edge of each bar and overhangs its concave face, and a stay 98 braces each bar and prevents it bending. These bars are located with their bearing-blocks 102 in the runways between the cam-faces 72 and 73 and the mandrel and with the concave faces of the bars facing toward the mandrel. These bars are actuated by a pair of crank-disks 104, mounted rigidly upon the opposite ends of a shaft 105, carried in bearings 106, secured to the under side of channel-irons 62, said shaft being driven by a pair of bevel-gears 108, one mounted thereon and the other upon a counter-shaft 109, upon which a sprocket-wheel 110 is also mounted and is driven by a chain 111 from a sprocket-wheel 112 upon the main driving-shaft 113. The operative connection between these crank-disks and the forming-bars is effected by slides 114, sliding in slots 115 in said crank-disks and adjustable to different radial positions (to vary the stroke thereof) by screws 116, rotatably carried in cross-pieces 117 at the outer ends of the slots and threaded through tapped borings in said slides. These slides have axially-projecting studs 119, upon each of which one end of a link 120 is pivoted, the other end thereof being forked and receiving between its prongs the lower ends of a pair of links 121, variable in length and the upper ends whereof are pivotally connected, as at 122, to the ends of the bearing-blocks upon the ends of the forming-bars. The upper ends of the links 120 are caused to reciprocate in a straight line by a pair of cross-heads 123, sliding in guides 124, provided with flanges 125, through which they are secured by bolts 126 to the channel-iron 62. (See Fig. 22.) The blank is guided to its proper position between these forming-bars by a pair of guiding-strips 127, supported by a series of pairs of brackets 128, bolted to a series of carrying-bars 129, bolted in turn to the top of the channel-irons 62.

When the blank is being formed into a pipe, it is clamped rigidly to the mandrel by a series of like clamping devices, of which I will describe one only in detail.

Figures 11, 12, 13, 14, 15:
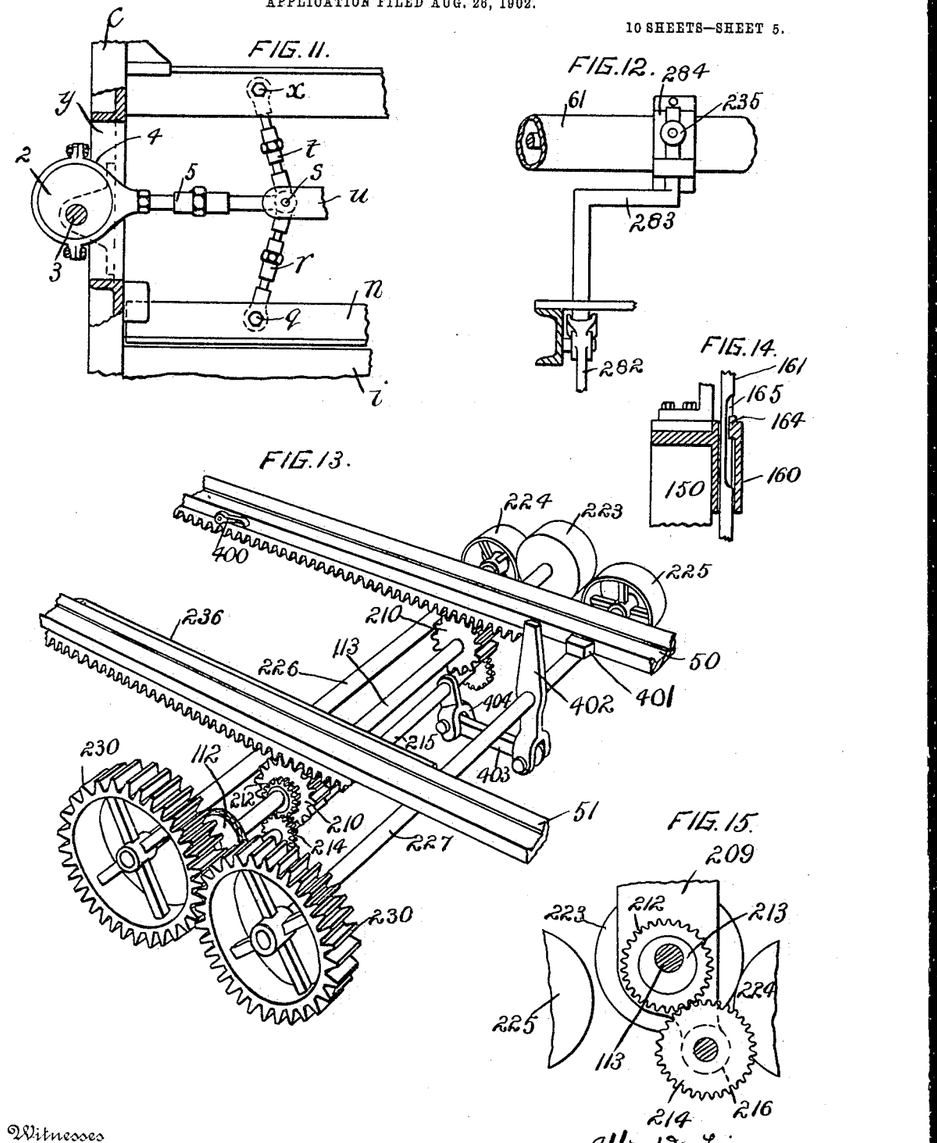
Fig. 11 is a side elevation, partly in section, of a portion of the blank-clamping means.
Fig. 12 is a detail view of a portion of the means for intermittently operating the pipe-forming bars.
Fig. 13 is a detail perspective view of the feed-racks and their driving-gear with the frame of the machine removed.
Fig. 14 is a detail sectional view of a portion of the means for feeding the pipe from division two to division three.
Fig. 15 is a detail elevation of the eccentric-gear and its operating-gear for changing the position thereof, and thereby the direction of travel of the carriages.

A cam-disk 130 is mounted upon the shaft 105 and has a peripheral depression 131, and a rod 132 is slidably guided in a perforated cross-bar 134, secured to the top of the channel-irons 62, and a sleeve 135 is formed in one with a cross-bar 136, secured to the under side of said channel-irons, the lower end of this rod 132 carrying a trundle-roll 137, which rests upon the periphery of the cam. A tubular length 138, having a flanged lower end 139, is slipped upon said rod 132 and is yieldingly supported thereon by a nut 140, threaded upon said rod, and an expansile helical spring 141, bearing between said nut and the flange 139. The upper end of the upper portion of this length 138 is flattened and concaved, as at 142, and has a series of projections 143 extending axially of the mandrel and adapted to take into the recess in the under side of the latter, and thereby grips and correspondingly forms the portion of the blank therebetween, this tubular length being flattened at its upper end to accommodate the forming-bars in their return to their lowermost position.

Figure 23:
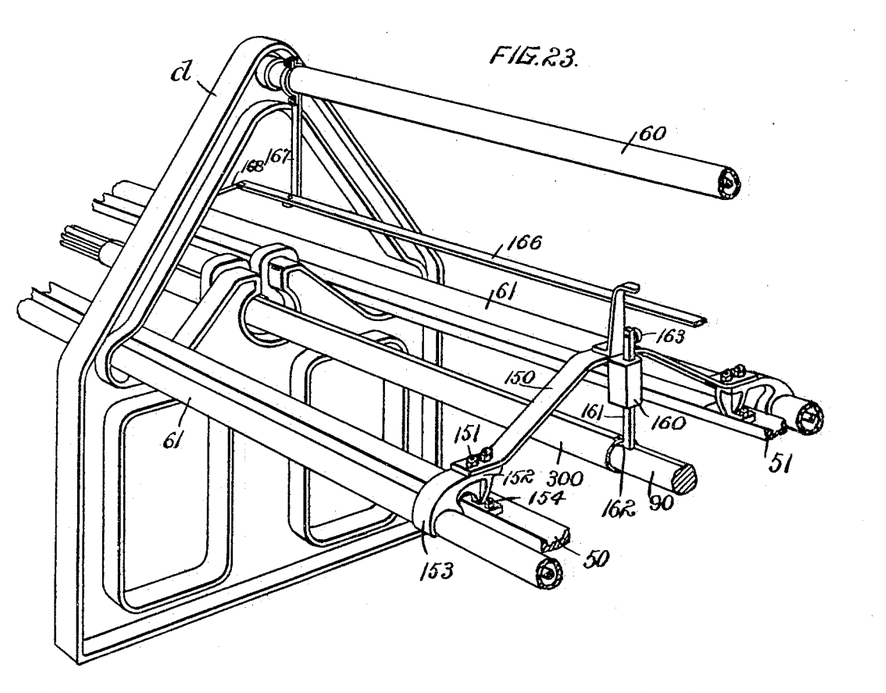
Fig. 23 is a perspective view of a portion of the machine-frame, illustrating particularly one of the standards, the carriage for feeding the pipe from division two to division three, and the means for disengaging the portion of the feeding means from its engaging position relatively to the pipe upon the mandrel.
Figures 24, 25, 26, 27:
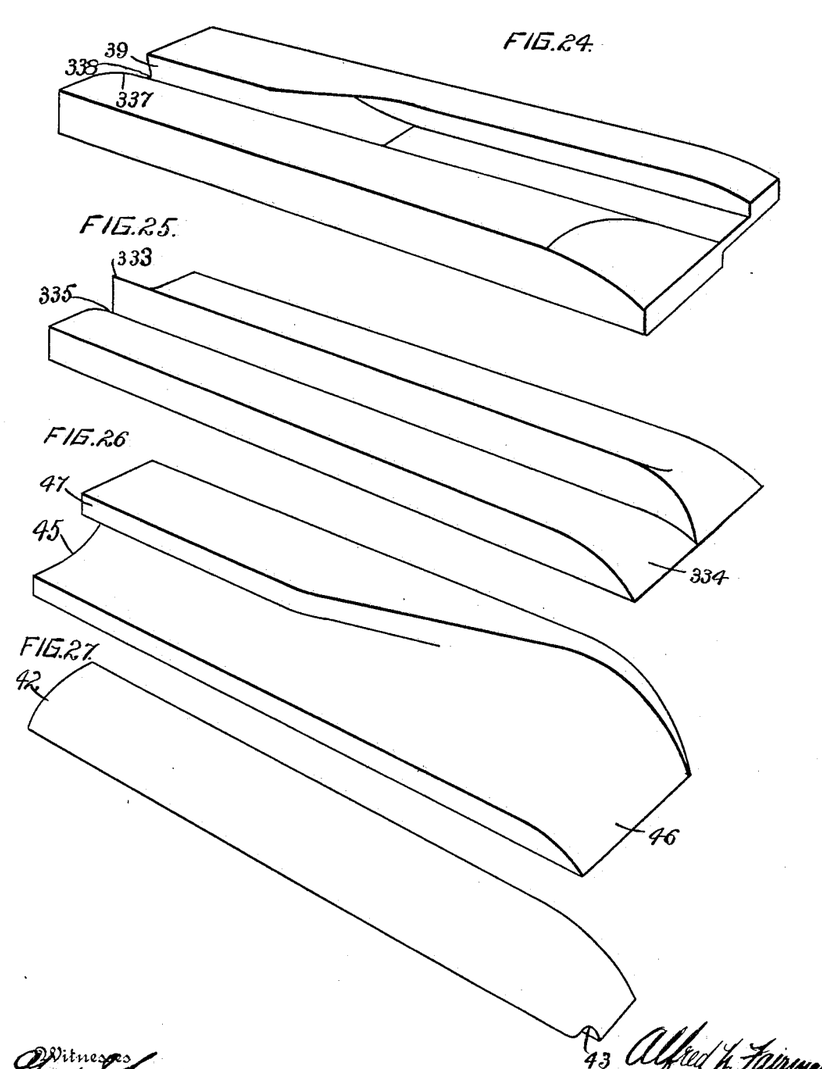
Figs. 24, 25, 26, and 27 are detail perspective views of the forming-blocks for forming the interlocking devices upon the longitudinal side edges of the blank, said views illustrating particularly the inside or forming faces of said block.

The pipe formed by bending the blank around the mandrel is delivered to the third division of the machine by a second carriage consisting of an oblong bent plate 150, secured at its ends by bolts 151 to a pair of brackets 152, having substantially circular portions 153, adapted to partially encircle and slide upon the tubular braces 61, and horizontal plate-like portions, bolted, as at 154, to the feeding-racks 50 and 51, to be presently described. A vertical tubular guide 160 is bolted to this carriage midway of its length, and a rod 161, having a beveled foot 162, is guided therein and has a trundle-roll 163 on the side of its upper end, while a key 164 inside of the guide projects into a groove 165 in the rod and prevents the turning of the latter. The foot of this rod is adapted to project into the end of the pipe when the carriage is caused to move toward the third division of the machine, and the rod is automatically lifted away from the pipe when the carriage is returning by a bar 166, hung by hangers 167 from the top brace. This bar constitutes a rail, and the trundle-roll 163 is guided up onto it by a short switching-bar 168, pivotally connected to the end thereof and projecting into the third division, the pivotal connection allowing it to ride over said trundle-roll as the carriage is delivering the pipe and falling behind the same when the pipe is delivered, while the opposite end of the rail extends to a point short of the standard *e* in order that the trundle-roll may fall therefrom and the foot rest upon the mandrel when the carriage reaches this end of its travel.

The pipe is corrugated between the standards *d* and *e*, or, as I have termed it, in the "third division" of the machine, and the means to this end are as follows: the part 91 (before mentioned) of the mandrel, which is corrugated, and a carriage consisting of two carrying-frames 170 and 171, coupled together by an open casting 172, having a pair of trundle-wheels 173 carried thereby and a pair of vertical transverse ribs 174 at each end, while between the ribs of each pair the lower ends of the frames 170 and 171 fit and are secured there by set-screws 175 threaded through the outermost rib of each pair into contact with said lower ends of the frames. A pair of stays 176 and 177 connect the top and bottom, respectively, of said frames together, and side extensions 178 of the frames are formed with hubs 179, which slide over a pair of tubular stays 180, bracing the standards *d* and *e* together. This carriage is supported mainly, however, upon an I-beam 181, also serving to brace these standards together and upon which the trundle-wheels 173 run. These frames have central openings 183 therein to accommodate the mandrel, and carrying-plates 184 are bolted thereto, and each has an annular rim 185 and an opening 186, concentric to said rim. A series of slidable bearing-brackets 187 lie upon these plates radially thereto, each bracket having a flange 188 upon one end, against which bears the inner end of an adjusting-screw 189, a series of which are carried by the rim 185, the other end of each bracket being forked and perforated to form bearings 110 for the trunnions of corrugating-wheels 191, while these slidable brackets are guided in their movement during adjustment by screws 192 taking through slots in said brackets into the plate 184. The ends of the racks 50 and 51 are connected by brackets 193 to this carriage, and two pairs of buffers, one pair carried by this third carriage and the other by the standard *e*, prevent damage to the parts at each end of the travel of the racks from concussion. The buffers carried by the carriage consist each of a bar 200, (preferably tubular,) screw-threaded at each end and in the middle and extending through holes in the two frames 170 and 171. A buffing-cap 201 is screwed on the forward end and a ring 202 on the rear end, the latter to constitute a stop to limit the forward movement of the buffer. An octagonal ring 203 is threaded upon the middle portion of this bar and is located between the frames, and an expansile helical spring 204 bears between this ring 203 and the rear frame 171, while a tapped nipple 205 is screwed upon the middle of the rod outside of the carriage and has a rubber washer 206 thereon to receive the impact of the blow if the spring should happen to be subjected to an extraordinary impingement. The buffers upon the standard *e* consist simply of retractile helical springs located, preferably, in line with the rear ends of the buffers just described.

The flattening of the pipe-seam simultaneously with the corrugation of the perimeter of the pipe, which is one of the features of my invention, is effected by a flattened portion 550 of the corrugated portion of the mandrel and a pair of flattening-rollers 551 and 552, carried in line with the flattened portion of the mandrel. (See particularly Figs. 2, 10, 20, 21, and 28.) The roller 551 is carried by the uppermost bracket upon the front frame 170 of the corrugating-carriage, and the roller 552 is carried by the corresponding bracket upon frame 171, the roller 552 being set closer to the mandrel than 551 in order to completely flatten the seam, which will have been partially flattened by roller 551. This flattening of the seam is done simultaneously with the corrugation of the pipe.

I have thus far described the operating parts of my improved machine, and I will now set forth the means for driving same.

The main driving-shaft 113 (before mentioned) is mounted in bearings 209, hung from the braces between the standards *c* and *d*, and it has a pair of pinions 210 mounted rigidly thereon and intermeshing with the feed-racks 50 and 51. A pair of gears 212 are rigidly mounted upon a pair of sleeves or bushings 213, loosely upon and eccentric to said shaft and loosely mounted in said hanging bearings, thus supporting said gears eccentric to the shaft. These gears intermesh with a pair of gears 214, rigidly upon a counter-shaft 215, mounted in a pair of bearings 216, projecting downwardly from and integral with said hanging bearings. A friction-drum 223 is mounted on the opposite end of the shaft 113 to that upon which the sprocket-wheel 112 is mounted. This main driving-shaft is rotated in either direction, according to the work to be done, by a pair of friction-drums 224 and 225, respectively mounted rigidly upon a pair of shafts 226 and 227. The shaft 226 is supported in bearing-boxes 228, secured to the frame of the machine, and the shaft 227 is supported in bearings carried in brackets such as that indicated at 229 and located one at each side of the machine. A pair of intermeshing gears 230 are mounted rigidly upon the adjacent ends of these last-mentioned shafts and are rotated by a gear 231 upon a shaft 232, a driving-pulley 234 rigidly thereon being driven from any available source of energy by a belt 245. Power is intermittently transmitted from sprocket-wheel 110 to the shaft 109, upon which it is rotatably mounted, by a clutch-block 276, slidably mounted thereon and keyed thereto and adapted to engage a clutch-face 277, formed upon the sprocket-wheel 110. This clutch-block is shifted into and out of operative engagement with said sprocket-wheel (which rotates continuously) by a lever-arm 278, connected midway of its length thereto, as at 279, and pivotally connected at its lower end, as at 280, to the base of the machine, while its upper end is pivotally connected by a link 281 to the lower end of the vertical arm of a bell-crank-lever 282, fulcrumed to a transverse brace 500. A vertically-movable cranked rod 283, guided in a guide 284 upon the frame of the machine, is pivotally connected at its lower end to the end of the horizontal arm of the bell-crank-lever, and it has a trundle-roll 235 upon its upper end, which at times runs upon a rail 236, having a pivoted switching-bar 237 and secured on the side of rack 51.

The machine is started in either direction and stopped by a lever 240, rigidly held upon the counter-shaft 215. A series of stop-bars 260 are hung from L-shaped bracket-pieces 261, adjustably secured to the top of the top braces (see Fig. 3) between standards $b$ and $c$ by bolts 262 taking through slots in said bracket-pieces and threaded into the top of said top braces. The connection between these stop-bars and their supporting-brackets consists of pivots 263 near their upper ends, while the vertical arms of the brackets act as a brace and prevent displacement of the bars away from the machine. A pair of stops 400 and 401 are upon one side of rack 50, and the machine is automatically stopped at the completion of its movement in either direction by one of these stops engaging the upper end of a lever-arm 402, fulcrumed between its ends upon the counter-shaft 227 and having its lower end connected by a link 403 to the lower end of a lever 404, rigidly secured upon counter-shaft 215. Upon either of these stops engaging this lever 402 the shaft 215 will be rotated sufficiently to throw the driven friction-drum 223 out of engagement with both driving-drums, thus stopping the machine. Upon the upper end of lever 402 being shifted lever 404 will be caused by link 403 to move with it and turn the shaft 215, upon which the pinion 214 is rigidly mounted. This pinion 214 rotates pinion 212, which is secured rigidly upon the eccentric 213, which rotates with it and throws the shaft 113, and with it friction-drum 223, from side to side and into bearing relation with either of the friction-drums 224 225 or out of bearing relation with both.

The corrugated pipe is delivered from the machine by a foot 385, formed on the lower end of a bar 386, carried on the rear of the corrugating-carriage and slidably connected thereto by a pair of bolts 387 taking through slots therein into tapped holes in the carriage, the bolts being loose in the slots to allow the bar to be raised upon the corrugated pipe when coming into contact with the rear end thereof and to fall by gravity when riding off the opposite end.

The portion of the machine between standards $b$ and $c$ constitutes division one, the portion between standards $c$ and $d$ division two, and the portion between $d$ and $e$ division three. Thus the blank has its longitudinal side edges trimmed and formed with interlocking devices in division one, it is curved into pipe form and its edges are locked in division two, and said locked edges are flattened and the pipe corrugated in division three.

Figure 1:
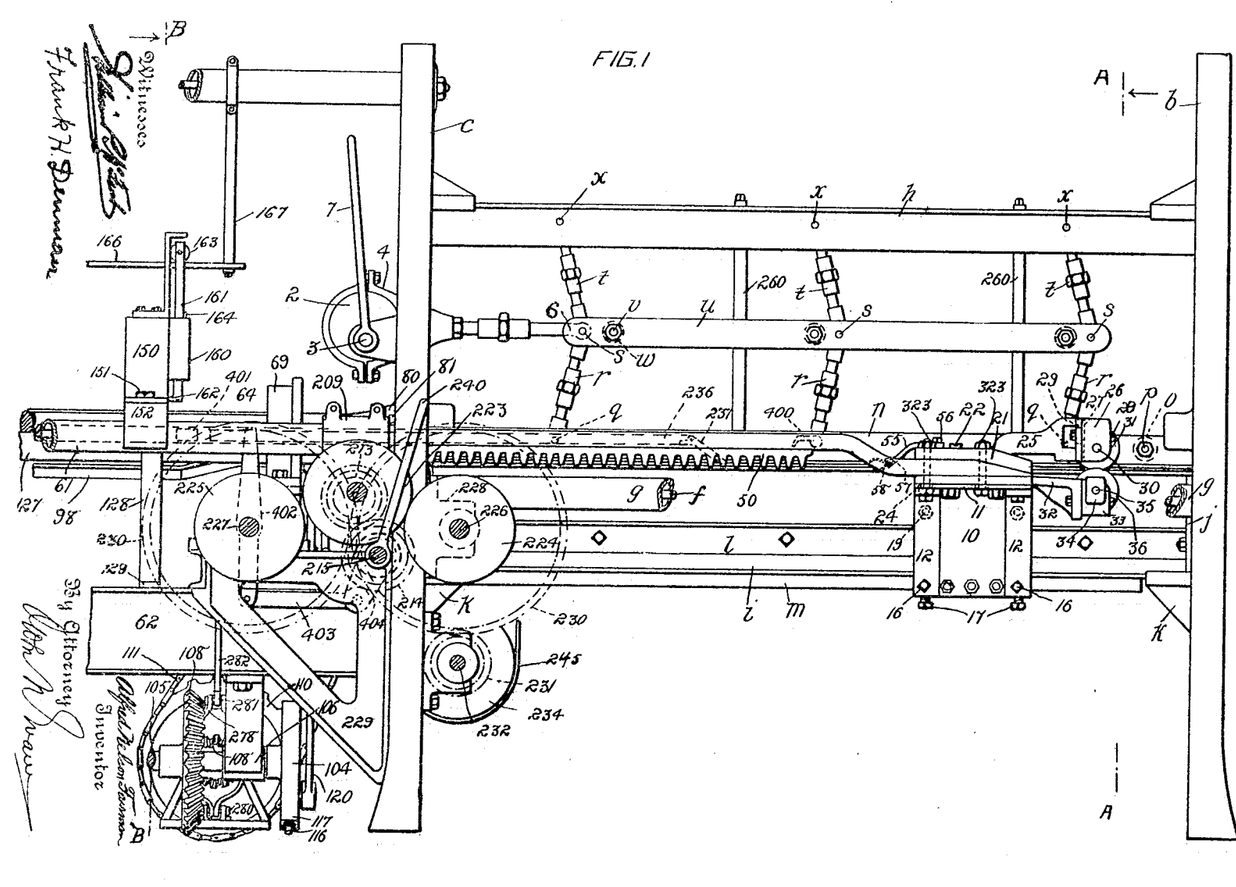
Figure 1 is an elevation of the right-hand half of the operator's or front side of my improved machine.
Figure 2:
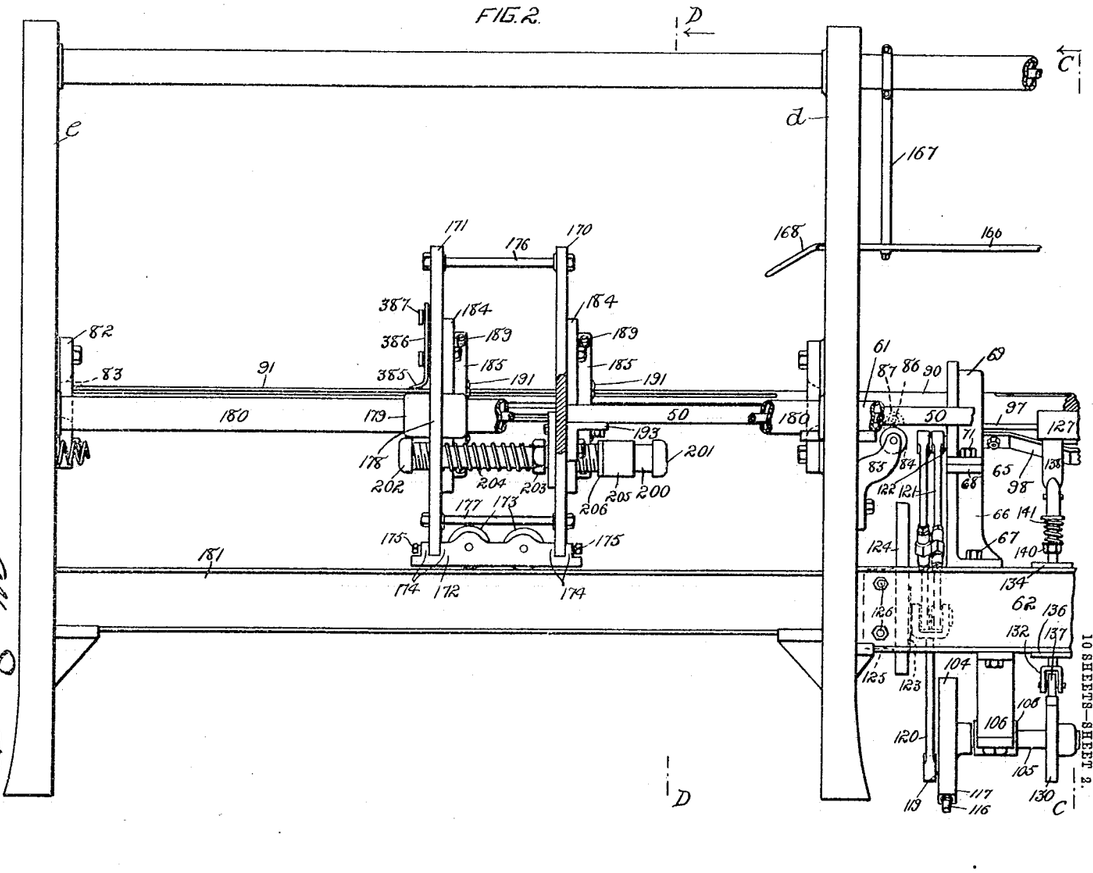
Fig. 2 is a similar view of the left-hand half thereof.

Operation: The operation of my improved pipe-making machine is as follows: It may be pointed out that the machine parts are in the positions as illustrated in the drawings (and particularly in Figs. 1, 2, and 16) when the parts in division one (1) are in the act of forming a blank 300 from a sheet 301, the parts in division two (2) in the act of bending the formed blank into pipe form, (see Figs. 1, 2, 4, 9, 17, 18, and 19,) and the parts in division three (3) in the act of corrugating the formed pipe and flattening the seam. (See Figs. 2, 10, 20, and 21.) With the driven friction-drum 223 in bearing relation with the driving friction-drum 224 upon shaft 226 the racks 50 and 51 (see Figs. 1, 4, 13, and 23) and the carriage moved thereby will be caused to travel in the direction indicated. The sheet metal from which the blank is to be formed is first inserted between the clamp and bed-plate of the first division and pushed in until it comes into contact with the stop-bars 260, (see Figs. 1, 3, and 16,) the machine having been first operated to bring the carriages to the extremity of their travel toward the left, (looking at Figs. 1 and 2.) The clamp, Figs. 1, 3, and 11, is then operated and the sheet of metal rigidly held. The starting-lever is then shifted to the position shown in Fig. 1, thus causing the sheet to be cut to the required width and the edges thereof formed with interlocking lips. When the carriages arrive at the end of their travel toward the right, the machine is automatically stopped by the stop 401 upon the rack 50 coming in contact with and shifting the lever 402, thereby rotating the eccentric 213 through the medium of link 403, lever 404, shaft 215, pinion 214, and pinion 212, thus throwing the driven friction-drum 223 out of bearing relation with the driving-drums and stopping the machine. The clamp is then released and the lever 240 is shifted, thereby reversing the machine and causing the first carriage to push the formed blank into the second division. Simultaneously the other carriages, with the first, will be moved to their extreme left position, and the machine will again be automatically stopped by the stop 400 upon the rack 50 engaging and shifting the lever 402, thereby rotating the eccentric 212 and throwing the driven friction-drum 223 out of bearing relation with the driving-drums. A new sheet is then inserted into division one and clamped in place and the machine is again started as first mentioned, thereby forming a new blank and simultaneously forming a pipe, with edges interlocked, from the first blank, after which the machine is again automatically stopped. The clamp is then again released and the machine once more reversed, the formed pipe delivered into the third division, and simultaneously the second blank delivered to the second division and the machine again automatically stopped. A third sheet is then inserted into the first division and clamped in place and the machine started, thereby simultaneously corrugating the pipe and flattening its seam, forming a pipe from the second blank and forming a third blank, after which the clamp is released and the machine reversed, thus delivering a completed pipe from the machine, and another is completed and delivered upon each reciprocation of the machine.

What I claim is as follows:

1. In a pipe-making machine the combination with means for forming a pipe, of a reciprocatory device, and means carried by said device and adapted to coact with the pipe-forming means whereby during movement in one direction a pipe is formed, and during movement in the opposite direction the pipe is fed from the pipe-forming means.

2. In a pipe making and corrugating machine the combination with means for forming a pipe to be subsequently corrugated and means for corrugating the pipe previously formed by said pipe-forming means, of a reciprocatory device and an operative connection between said device and the pipe forming and corrugating means whereby during movement in one direction, a pipe is formed and a pipe previously formed is simultaneously corrugated, and during movement in the opposite direction the pipe is fed from the pipe-forming means to the pipe-corrugating means, and the corrugated pipe from the pipe-corrugating means simultaneously.

3. In a pipe making and corrugating machine the combination with means for forming a blank from which a pipe is to be formed, means for forming a pipe to be subsequently corrugated from a blank previously formed by said blank-forming means, and means for corrugating the pipe previously formed by said pipe-forming means, of a reciprocatory device and means carried by said device and adapted to coact with said blank and pipe forming and pipe-corrugating means whereby during movement in one direction a blank and a pipe are formed and a pipe is corrugated simultaneously, and during movement in the opposite direction the blank is fed from the blank-forming means to the pipe-forming means, the pipe from the pipe-forming means to the pipe-corrugating means and the corrugated pipe from the corrugating means, simultaneously.

4. A pipe forming and corrugating machine consisting of three divisions arranged in tandem, the first division comprising means for forming a blank from a sheet of metal, the second division comprising means for forming a pipe from a blank formed in said first division, and the third division comprising means for corrugating the pipe formed in said second division, and means for operating the mechanism in said three divisions simultaneously.

5. A pipe forming and corrugating machine consisting of three divisions arranged in tandem, the first division comprising means for forming a blank from a sheet of metal, the second division comprising means for forming a pipe from a blank formed in said first division, and the third division comprising means for corrugating the pipe formed in said second division, means for operating the mechanism in said three divisions simultaneously, and means for feeding the blank from division one to division two, the pipe from division two to division three, and the corrugated pipe from division three.

6. In a pipe-forming machine the combination with pipe-forming means and a suitably-supported bed-plate extending longitudinally of said machine, means for clamping a sheet of metal from which a blank is to be cut upon said bed-plate, a blank-shearing device, and an edge-folding or hook-forming device, of means for causing said shearing and folding or hook-forming devices to travel longitudinally to said bed-plate, and operate simultaneously to shear the blank and fold the edge thereof.

7. In a pipe-making machine, the combination with the frame thereof, pipe-forming means, and a suitably-supported bed-plate, of a clamping-bar; a series of toggle-bars connecting said clamping-bar to the frame, a rigid link-bar connecting the pivot-points of said toggle-bars together, an eccentric, means connecting said eccentric to said link-bar, a blank-shearing device and an edge-forming device, and means for causing said shearing and forming devices to operate simultaneously, substantially as described and for the purpose set forth.

8. In a pipe-forming machine the combination with pipe-forming means and a suitably-supported bed-plate, of means for clamping a sheet of metal from which a blank is to be cut upon said bed-plate, a carriage, a blank-shearing device and an edge-forming device both mounted upon said carriage in positions to act upon the clamped sheet of metal, means for causing said carriage to travel from end to end of said bed-plate, and means for delivering the cut and formed blank from said bed-plate to said pipe-forming means, substantially as described and for the purpose set forth.

9. In a pipe-making machine, the combination with pipe-forming means, of a pair of standards, an I-beam extending between and secured at its ends to said standards and arranged with its flanges horizontal, a pair of rails secured one on each side of the web of said I-beam a carriage having a pair of trundle-rolls thereon adapted to run upon said rails, a blank-shearing device and an edge-forming device both mounted upon said carriage in positions in line with the sides of the top flanges of said I-beam, means for causing said carriage to travel from end to end of said I-beam, and means for delivering the cut and formed blank from said top flange to said pipe-forming means, substantially as described and for the purpose set forth.

10. In a pipe-making machine the combination with means for curving a blank into pipe form and means for corrugating the pipe thus formed, of a mandrel forming a part of said curving and corrugating means and extending continuously through said curving and corrugating means, for the purpose set forth.

11. Blank shearing and forming means comprising a support for a sheet of metal from which the blank is to be cut and formed, means for rigidly holding said sheet upon said support, a pair of forming-blocks located at each side of said support, means for coupling said forming-blocks together, shearing means carried by each pair of said blocks, and means for causing said blocks to travel longitudinally of said support, substantially as described and for the purpose set forth.

12. In a pipe-forming machine the combination with a mandrel, of a pair of guiding devices encircling said mandrel a distance apart, a pair of forming-bars extending parallel to said mandrel and having their ends located in said guiding devices, means for feeding a pipe-blank between said forming-bars and mandrel, and means for causing said forming-bars to move laterally and around said mandrel, substantially as described and for the purpose set forth.

13. In a pipe-forming machine the combination with a mandrel and means for supporting the same, of a bearing device, means for moving said bearing device around said mandrel, means for varying the extent of movement of said bearing device, and means for guiding said bearing device in its movement.

14. In a pipe-forming machine the combination with a mandrel with its halves on opposite sides of a vertical axial plane of different diameter and means for supporting the same, of a pair of bearing devices, means for moving said bearing devices, around each side of said mandrel, and means for guiding said bearing devices adjacent to said halves of the mandrel in their movement.

15. In a pipe-forming machine the combination with a mandrel with its halves on opposite sides of a vertical axial plane of different diameter and means for supporting the same, of a pair of bearing devices, means for moving said bearing devices, around each side of said mandrel, means for varying the extent of movement of said bearing devices, and means for guiding said bearing devices adjacent to said halves of the mandrel in their movement.

16. In a pipe-forming machine the combination with a mandrel and means for supporting the same, of a pair of bars extending parallel to said mandrel, a shaft extending parallel to said mandrel, means for intermittently rotating said shaft, a disk rigidly upon said shaft, a pitman, means for pivotally connecting one end of said pitman to said disk eccentric thereto, a pair of links pivotally connected at one end of each to the other end of said pitman and at their other ends respectively to said forming-bars, and means for guiding said bars to follow the contour of said mandrel, substantially as described, and for the purpose set forth.

17. In a pipe-forming machine the combination with a mandrel and means for supporting the same, of a pair of bars extending parallel to said mandrel, a shaft extending parallel to said mandrel, means for intermittently rotating said shaft, a disk rigidly upon said shaft, a pitman, adjustable means for pivotally connecting one end of said pitman to said disk eccentric thereto, a pair of links pivotally connected at one end of each to the other end of said pitman and at their other ends respectively to said forming-bars, and means for guiding said bars to follow the contour of said mandrel, substantially as described, and for the purpose set forth.

18. In a pipe-forming machine the combination with a mandrel and means for supporting the same, of means for clamping a pipe-blank upon said mandrel a bearing device, means for moving said bearing device around said mandrel, and means for guiding said bearing device in its movement.

19. In a pipe-forming machine the combination with a mandrel having a longitudinal groove and means for supporting the same, of a bearing device, means for moving said bearing device around said mandrel, means for guiding said bearing device in its movement, and means for clamping a pipe-blank upon said mandrel consisting of a shaft, means for intermittently rotating said shaft, a cam rigidly upon said shaft, a reciprocal rod operatively connected to said cam and having a projection at one end adapted to fit into said groove in the mandrel, substantially as described and for the purpose set forth.

20. In a pipe-making machine the combination with a mandrel having a flattened portion extending from end to end of one side of the perimeter thereof said mandrel being adapted to receive a pipe the seam whereof is to be flattened, a reciprocatory head, a seam-flattening roller mounted rigidly upon said head and adapted to coact with said flattened portion of the mandrel to flatten the seam of the pipe during the movement of the head in one direction, of means for feeding a pipe, the seam of which is to be flattened, onto the mandrel, and means for delivering the pipe from the mandrel after the seam has been flattened.

21. In a pipe-making machine the combination with a mandrel having a flattened portion extending from end to end of one side of the perimeter thereof said mandrel being adapted to receive a pipe the seam whereof is to be flattened, a reciprocatory head a seam-flattening roller mounted rigidly upon said head and adapted to coact with said flattened portion of the mandrel to flatten the seam of the pipe during the movement of the head in one direction, of means for feeding a pipe, the seam of which is to be flattened, onto the mandrel, and means acting in conjunction with said head for delivering the pipe from the mandrel after the seam has been flattened.

22. In a pipe-corrugating machine the combination with a longitudinally-corrugated mandrel having a flattened portion extending from end to end of one side of the perimeter thereof said mandrel being adapted to receive a pipe the seam whereof is to be flattened, a reciprocatory corrugating-head, a seam-flattening roller mounted rigidly upon said head and adapted to coact with said corrugating-head and flattened portion of the mandrel to flatten the seam of the pipe during the movement of the head in one direction, of means for feeding a pipe, the seam of which is to be flattened, onto the mandrel, and means acting in conjunction with said head for delivering the pipe from the mandrel after the seam has been flattened.

23. In a pipe-corrugating machine the combination with a longitudinally-corrugated mandrel having a flattened top upon which the pipe-seam is flattened, and means for feeding a pipe to be corrugated to said mandrel of an annular frame encircling said mandrel, a series of bearing-brackets carried rigidly upon said frame radially of said mandrel, a flattening-roller carried by the inner end of the top bracket, a series of corrugating-rollers carried by the inner ends of the other brackets and bearing in the corrugations in said mandrel, and means for reciprocating said frame longitudinally of said mandrel, substantially as described and for the purpose set forth.

24. In a pipe-forming machine the combination with pipe-forming means comprising a mandrel and accessory pipe-forming parts, and a reciprocating pipe-feeding carriage, of a vertical slidable device adapted to automatically assume a position adjacent to said mandrel when said carriage moves in one direction, and means for sliding said device vertically away from said mandrel when the carriage moves in an opposite direction, substantially as described and for the purpose set forth.

25. In a pipe-forming machine the combination with pipe-forming means comprising a mandrel and accessory pipe-forming parts, and a reciprocating pipe-feeding carriage, of a vertically-movable rod having a foot at its lower end and a trundle-roll at its upper end, said rod being adapted to automatically assume a position adjacent to said mandrel when said carriage moves in one direction, a rail, means for suspending said rail above said mandrel, and a switching-piece pivoted to one end of said rail for engaging beneath said trundle-roll and moving said rod away from said mandrel when the carriage moves in an opposite direction, substantially as described and for the purpose set forth.

26. The combination with a pipe forming and corrugating machine in three divisions consisting respectively of a blank-forming division, a pipe-forming division, and a pipe-corrugating division, of a pair of oppositely-driven friction-drums a short distance apart, a laterally-adjustable shaft extending between said friction-gears, a friction-drum rigidly upon said shaft and adapted upon adjustment of said shaft to engage either gear of said pair, a pair of pinions rigidly upon said shaft, a pair of slidable toothed racks extending longitudinally of said machine and in engagement with said pinions; a carriage within said first division and secured to one end of said racks, and carrying the blank-forming means; a second carriage within said second division and secured to said racks midway of their length and carrying means for acting upon the formed pipe; and a third carriage within said third division and secured to the opposite end of said racks and carrying a portion of the pipe-corrugating means, substantially as described and for the purpose set forth.

27. In a pipe forming and corrugating machine including a pair of reciprocating feed-racks, the combination with said racks and means for reciprocating same, of means for disconnecting said racks from their reciprocating means upon the termination of their movement in each direction, substantially as and for the purpose set forth.

28. In a pipe-forming machine, a pair of forming-blocks located one above the other, the lower one consisting of a plate having a concavo-plane vertical rib extending from end to end thereof and increasing gradually in height from one end to the other, the end of least height being formed with a gentle curve, said plate having a clearance-groove extending longitudinally of and adjacent to the planed side of said rib, said rib having its planed side inclined downwardly toward the convex side thereof; the upper member consisting of a plate formed with a groove extending longitudinally thereof, one complete wall of said groove corresponding in contour to the concaved side of the rib upon the other member, the other wall of said groove gradually turned toward the convex wall and comprising a concave form at one portion and having another portion thereof plane and inclined slightly downwardly and toward the convex wall of the groove, substantially as described and for the purpose set forth.

29. In a pipe-forming machine, an edge-former consisting of a pair of members one of which is formed with a convex inner face and a recessed edge; the other member consisting of a bar having a concave continuous recess in one side, said recess being flared at one end, a flange overhanging this recess and adapted to register with the recessed edge of the other member, and means for securing said members together, substantially as described and for the purpose set forth.

In testimony whereof I have affixed my signature in presence of two witnesses.

ALFRED NELSON FAIRMAN.

Witnesses:
FRED J. SEARS,
FRANK H. DENMAN.